J. W. BARTON.
STEAM TRAP.
APPLICATION FILED NOV. 21, 1908.
941,846.
Patented Nov. 30, 1909.
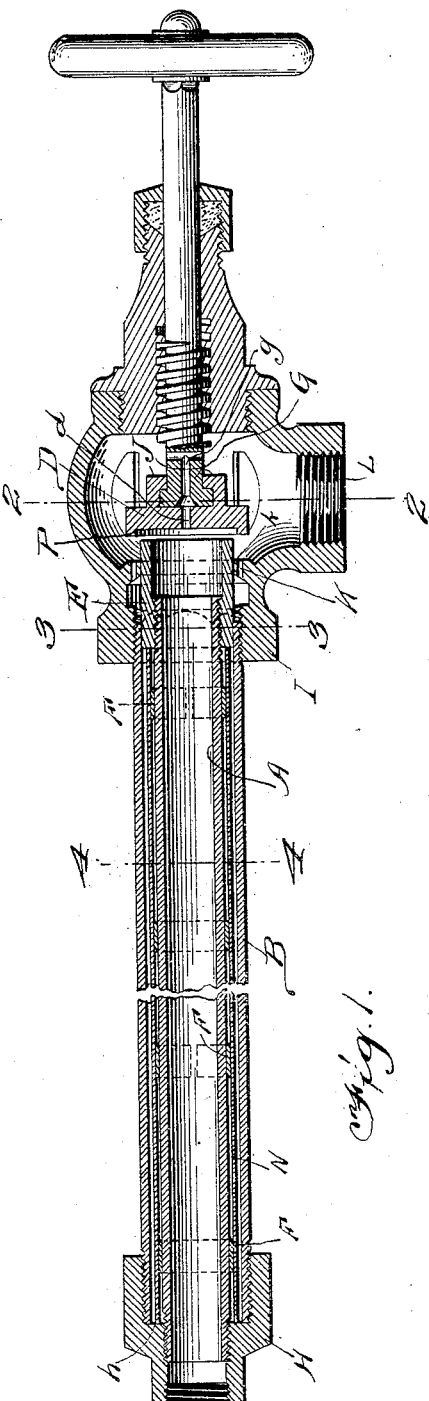
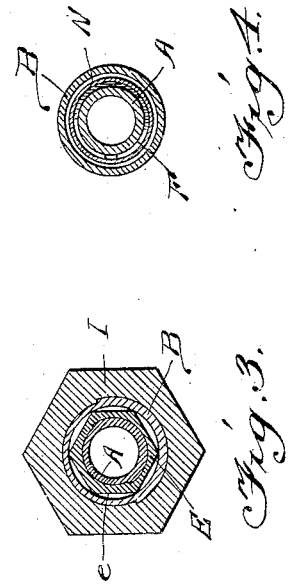
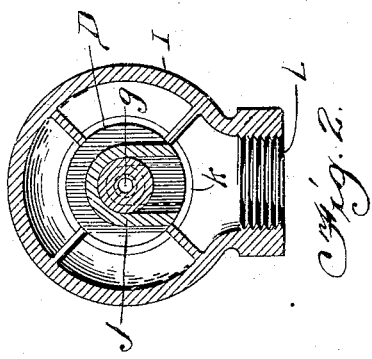
Inventor
John W. Barton.
By
Attorney
Witnesses

UNITED STATES PATENT OFFICE.

JOHN W. BARTON, OF CLEVELAND, OHIO.

STEAM-TRAP.

941,846.  Specification of Letters Patent.  Patented Nov. 30, 1909.

Application filed November 21, 1908. Serial No. 463,815.

*To all whom it may concern:*

Be it known that I, JOHN W. BARTON, citizen of the United States, residing at Cleveland, in the county of Cuyahoga and State of Ohio, have invented certain new and useful Improvements in Steam-Traps, of which the following is a specification.

This invention relates to steam traps of the type having an expansion tube, and the principal objects of the invention are to provide first, means for allowing the trap to be used in series with a number of radiators, by the provision of a positive by-pass in the trap through which the fluid can flow even when the valve of the trap is closed; second to provide a tube or casing around the expansion tube to produce a dead air space around the said tube, and to allow a vacuum to be more easily maintained in the trap, the device being particularly adapted for use on vacuum systems.

With these and other objects in view the invention is hereinafter explained and is illustrated in the accompanying drawings in which—

Figure 1 is a longitudinal section of the trap; Figs. 2, 3 and 4 are sections on the lines 2—2, 3—3 and 4—4 of Fig. 1 respectively.

Referring specifically to the drawings, A is an expansion tube screwed firmly at one end in the fitting H. This tube is located within and spaced from the outer tube B which is also screwed into the bell of the fitting H. The opposite end of the tube B is screwed into the casing I of the main valve. The end of the expansion tube is provided with a tubular valve seat E which is truncated as at *e* to receive a wrench so that it may be turned to desired adjustment; and the truncations provide spaces through which a vacuum may be drawn in the annular space or vacuum chamber within the tube B. The valve seat projects into the valve casing through a guide formed by a shoulder *k* on the inside of the casing, and this shoulder has a number of ports K which provide communication between the vacuum chamber and the main chamber of the valve. The valve seat E fits in the guide at a working fit, and its end projects beyond the same, into the chamber of the valve casing. The valve disk D is connected to a screw stem G by which the valve is opened or closed or adjusted. The disk is held in position by ribs J on the valve casing.

The inlet to the trap is through the fitting H, and the outlet is at L, which will be connected either directly, or indirectly through a radiator, to a vacuum pump, or to a waste outlet.

Extending around the tube A, between the same and the tube B, is a tubular casing N which is spaced from the tube A by incomplete rings F. This tube is slipped over the expansion tube A and is held in place by the rings and by a ground joint at one end against the shoulder *h* of the fitting H; and at the other end it is held in place by the valve seat piece E which is screwed in against the end of said tube or casing N. A soft metallic gasket may be inserted between the fitting H and the end of the tube N, if desired. This tube or casing N is made of a metal having a greater coefficient of expansion than that of the tube A, so that its expansion will be at least equal to that of the expansion tube. It maintains at all times a dead air space around the expansion tube. The annular space between the tubes N and B forms a vacuum chamber in which a vacuum can be easily maintained.

The valve disk D has a hole or port *d* through the same, which communicates with a passage *g* in the valve stem, and thereby with a cross passage opening into the interior of the valve casing. This produces a by-pass through the valve, equal to the area of the hole in the disk, and increases the capacity of the trap with respect to the amount of radiating pipes it will drain, and it is particularly useful in connection with low pressure systems, wherein it is desirable that some flow through the trap be permitted at all times. The disk is slipped over a shoulder at the foot of the valve stem and can be readily removed when desired. The disk with the hole through the same will be used on low pressure systems only, and to change to high pressure the disk will be removed and a solid one substituted, and this is all the change that will be required. Furthermore, the disk is provided with a lip or projection P around the edge thereof and located beyond or outside the edge of the valve seat E. When the condensation escapes it will strike said lip and will thereby be prevented from impinging with its whole force against the wall of the main valve casing. With plain valves, the continual blast of the condensation against the wall of the valve weakens and wears out the same, but by having a lip on the valve the wear is transferred to the valve disk, which can be easily replaced, and at a much less expense than the cost of a new valve casing.

In operation the valve disk is properly adjusted to allow condensation to escape as it forms. When a vacuum pump is used a vacuum is drawn in the annular space between the tubes B and N, through the ports K, thereby making said space nonconducting, which keeps the outer tube B cooler than the expansion tube A, and this action is assisted by the addition of the tube N, which makes a dead air space between it and the tube A which acts to partially insulate the expansion tube A from the vacuum space. Inasmuch as the tube N has a greater coefficient of expansion than the tube A, said tube N will at all times be held tightly at its ends against the fitting H and the valve seat piece E, said tube being put in place when the parts are cold and accordingly when the tube A is at its shortest length, and whatever heat reaches the tube N will expand the same to maintain said tight contact at its ends, the coefficient of expansion being enough greater than that of the tube A to produce this result.

In consequence of the by-pass through the valve, some flow through the trap will at all times exist, which is necessary or desirable on low pressure systems.

I claim:

1. A steam trap having an inlet and an outlet, an expansion tube connected to the inlet at one end, a valve coöperating with the other end of the tube, said valve having an opening through the same, which permits restricted flow through the trap from the inlet to the outlet when the valve is closed.

2. A steam trap having an expansion tube with a valve seat piece at the end thereof, and a valve stem and removable disk thereon, coöperating with said seat, the disk having an opening therethrough, to permit restricted flow through the trap when the valve is closed.

3. A steam trap having an inlet and an outlet, an expansion tube forming the sole passage through the trap, from the inlet to the outlet, a valve coöperating with the tube, and means to permit restricted flow through the tube when the valve is closed.

4. A steam trap having an outer casing, an inner expansion tube, and an intermediate tube spaced between the said tube and casing, said intermediate tube being closed at its ends, around the expansion tube.

5. A steam trap having an outer casing, in which a vacuum may be drawn, an inner expansion tube, and an intermediate expansible tube inclosing and spaced from the inner tube, said space being closed at its ends, forming a dead air space between the two tubes, the coefficient of expansion of the intermediate tube being greater than that of the inner tube.

6. A steam trap having an outer casing, in which a vacuum may be drawn, an expansion tube within the casing, and means to maintain a dead air space around the outside of the expansion tube under all conditions thereof.

In testimony whereof, I do affix my signature in presence of two witnesses.

JOHN W. BARTON.

Witnesses:
JOHN A. BOMMHARDT,
MONROE E. MILLER.